US012752187B2

(12) United States Patent
Hennessy et al.

(10) Patent No.: US 12,752,187 B2
(45) **Date of Patent: *Oct. 6, 2026**

(54) GAMING MACHINE WITH A CURVED DISPLAY

(71) Applicant: Video Gaming Technologies, Inc., Franklin, TN (US)

(72) Inventors: Edward Hennessy, Reno, NV (US); Ryan Cuddy, Reno, NV (US); Jason Todd Sprinkle, Pauline, SC (US); Paul W. Mellender, Waltham, MA (US)

(73) Assignee: Video Gaming Technologies, Inc., Franklin, TN (US)

( * ) Notice: Subject to any disclaimer, the term of this patent is extended or adjusted under 35 U.S.C. 154(b) by 182 days.

This patent is subject to a terminal disclaimer.

(21) Appl. No.: 18/792,008

(22) Filed: Aug. 1, 2024

(65) Prior Publication Data

US 2024/0382841 A1 Nov. 21, 2024

Related U.S. Application Data

(63) Continuation of application No. 17/347,302, filed on Jun. 14, 2021, now Pat. No. 12,083,419, which is a (Continued)

(51) Int. Cl.

*A63F 13/26* (2014.01)
*A63F 13/2145* (2014.01)

(Continued)

(52) U.S. Cl.

CPC .......... *A63F 13/26* (2014.09); *A63F 13/2145* (2014.09); *A63F 13/35* (2014.09); *G07F 17/3211* (2013.01)

(58) Field of Classification Search

None

See application file for complete search history.

(56) References Cited

U.S. PATENT DOCUMENTS 5,722,891 A 3/1998 Inoue
5,788,573 A 8/1998 Baerlocher (Continued)

FOREIGN PATENT DOCUMENTS

AU 2014373841 7/2016
JP 2003038843 2/2003

(Continued)

OTHER PUBLICATIONS

Australian Examination Report No. 1 issued in App. No. AU2021290441, dated Feb. 17, 2023, 2 pages.

(Continued)

*Primary Examiner* — Tramar Harper

(74) *Attorney, Agent, or Firm* — Armstrong Teasdale LLP

(57) ABSTRACT

A system includes a display device including a display surface configured to display a graphic and including an opening. The system also includes a peripheral device mounted within the opening of the display surface, and a processor configured to execute instructions stored in a memory device, which when executed, cause the processor to at least: display the graphic on the display surface of the display device adjacent to the peripheral device, whereby the graphic is displayed at least partially in association with the peripheral device.

13 Claims, 6 Drawing Sheets

Related U.S. Application Data continuation of application No. 16/459,230, filed on Jul. 1, 2019, now Pat. No. 11,045,726, which is a continuation of application No. 15/333,614, filed on Oct. 25, 2016, now Pat. No. 10,363,480, which is a continuation-in-part of application No. 14/145,752, filed on Dec. 31, 2013, now Pat. No. 9,478,097.

(51) Int. Cl.
*A63F 13/35* (2014.01)
*G07F 17/32* (2006.01)

(56) References Cited

U.S. PATENT DOCUMENTS

D481,078 S 10/2003 Stephan
D497,166 S 10/2004 Vick
D501,854 S 2/2005 Vick
7,275,993 B2 10/2007 Hosaka
7,654,899 B2 2/2010 Durham
7,677,969 B2 3/2010 Rist
7,811,170 B2 10/2010 Winans
D646,337 S 10/2011 Kelly
8,262,480 B2 9/2012 Cohen
D685,033 S 6/2013 Wudtke
D706,741 S 6/2014 Myers
8,974,297 B2 3/2015 Massing
9,094,576 B1 7/2015 Karakotsios
9,171,418 B2 10/2015 Loose
RE46,169 E 10/2016 Kelly
D768,629 S 10/2016 Bae
9,478,097 B2 10/2016 Hennessy
9,503,679 B2 11/2016 Lee
9,736,956 B2 8/2017 Moon
10,127,761 B2 11/2018 Woels
D842,933 S 3/2019 Castro
D843,467 S 3/2019 Johnson
D843,474 S 3/2019 Lesley
D843,475 S 3/2019 Lesley
D843,476 S 3/2019 Lesley
D850,536 S 6/2019 Stair
D872,190 S 1/2020 Zedell, Jr.
10,580,252 B2 3/2020 Whelan
D880,606 S 4/2020 Glenn, II
D882,696 S 4/2020 Lesley
D882,697 S 4/2020 Lesley
D882,698 S 4/2020 Lesley
D889,553 S 7/2020 Glenn, II
D890,264 S 7/2020 Johnson
D890,265 S 7/2020 Johnson
D890,849 S 7/2020 Johnson
D890,850 S 7/2020 Johnson
D890,851 S 7/2020 Johnson
D893,630 S 8/2020 Urban
D893,631 S 8/2020 Glinka
D895,019 S 9/2020 Lesley
D903,658 S 12/2020 Catania
D905,172 S 12/2020 Zedell, Jr.
D907,123 S 1/2021 Demarco
D913,378 S 3/2021 Glenn, II
D920,324 S 5/2021 Warren
D923,102 S 6/2021 Mcgahn
D926,889 S 8/2021 Bruzzese
D939,025 S 12/2021 Bruzzese
D939,502 S 12/2021 Lee
11,288,916 B2 3/2022 Coon
D954,844 S 6/2022 Rosander
D954,845 S 6/2022 Johnson
2003/0083132 A1 5/2003 Berg
2004/0212555 A1 10/2004 Falco
2004/0229698 A1 11/2004 Lind
2005/0049028 A1 3/2005 Gornez
2005/0064926 A1 3/2005 Walker
2005/0070353 A1 3/2005 Webb
2006/0073876 A1* 4/2006 Cuddy ................ G07F 17/3244 463/20
2006/0121969 A1* 6/2006 Marks ................. G07F 17/3267 463/16
2006/0128467 A1* 6/2006 Thomas .............. G07F 17/3211 463/31
2007/0026923 A1* 2/2007 Muir ....................... G07F 17/32 463/16
2008/0026822 A1* 1/2008 Walker .................... G07F 17/32 463/25
2008/0108408 A1* 5/2008 Wolf ....................... G07F 17/34 463/20
2008/0132320 A1* 6/2008 Rodgers .................. G07F 17/32 463/20
2008/0132332 A1 6/2008 Pryor
2008/0211779 A1 9/2008 Pryor
2008/0228865 A1 9/2008 Cruzada
2008/0274798 A1 11/2008 Walker
2008/0318655 A1 12/2008 Davies
2009/0036208 A1 2/2009 Pennington
2009/0069069 A1 3/2009 Crowder, Jr.
2009/0102763 A1 4/2009 Border
2009/0124326 A1* 5/2009 Caputo ................... G07F 17/34 463/20
2009/0191936 A1* 7/2009 Hawkins ................. G07F 17/32 463/43
2009/0202114 A1 8/2009 Morin
2010/0124982 A1 5/2010 Stewart
2010/0321287 A1 12/2010 Hine
2011/0003630 A1 1/2011 Rasmussen
2011/0285891 A1 11/2011 Maglaque
2011/0300937 A1* 12/2011 Crowder, Jr. ....... G07F 17/3213 463/34
2012/0004030 A1 1/2012 Kelly
2012/0147131 A1 6/2012 Yoon
2012/0154510 A1 6/2012 Huitema
2012/0287223 A1 11/2012 Zhang
2013/0023337 A1 1/2013 Bowers
2013/0040731 A1 2/2013 Bernard
2013/0094126 A1 4/2013 Rappoport
2013/0182062 A1 7/2013 Son
2013/0300732 A1 11/2013 Hosoya
2014/0118970 A1 5/2014 Kim
2014/0132854 A1 5/2014 Wu
2015/0036077 A1 2/2015 Lee
2015/0187166 A1 7/2015 Hennessy
2015/0379808 A1 12/2015 Rosenblatt
2016/0378334 A1 12/2016 Liu
2017/0036107 A1 2/2017 Hennessy
2017/0123454 A1 5/2017 Evans, V
2017/0126979 A1 5/2017 Evans, V
2018/0157362 A1 6/2018 Kim
2018/0219987 A1 8/2018 Pantel
2018/0262663 A1 9/2018 Zhang
2019/0043452 A1 2/2019 Silvanto
2019/0321722 A1 10/2019 Hennessy

FOREIGN PATENT DOCUMENTS

JP 2008054131 3/2008
JP 2010015015 A 1/2010
KR 20040051651 A 6/2004
KR 20130027335 A 3/2013

OTHER PUBLICATIONS

Cereal Marshmallows Video; Slot "Jackpot" Wheel of Fortune Machine Slots Winner Progressive Win Cash Reno Nevada Siena Casino; (Apr. 2, 2013) available at https://www.youtube.com/watch?v=OXcBXQ9G8UI; last visited May 18, 2015.

PCT International Search Report for related matter PCT/US2014/072730 dated Apr. 29, 2015; 11 pp.

Office Action dated Aug. 6, 2020 for U.S. Appl. No. 16/459,230 (pp. 1-22).

Office Action dated Nov. 30, 2020 for U.S. Appl. No. 16/459,230 (pp. 1-13).

Australian Examination Report No. 1 for App. No. AU2020201640, dated Sep. 17, 2020, 3 pages.

(56) References Cited

OTHER PUBLICATIONS

Notice of Allowance dated Mar. 11, 2021 for U.S. Appl. No. 16/459,230 (pp. 1-7).
Office Action (Non-Final Rejection) dated Jul. 22, 2022 for U.S. Appl. No. 17/347,302 (pp. 1-25).
Office Action (Final Rejection) dated Feb. 2, 2023 for U.S. Appl. No. 17/347,302 (pp. 1-22).
Office Action dated Nov. 18, 2022 for U.S. Appl. No. 29/696,820 (pp. 1-10).
Notice of Allowance dated Mar. 16, 2023 for U.S. Appl. No. 29/696,820 (pp. 1-5).
Office Action (Non-Final Rejection) dated Jan. 19, 2024 for U.S. Appl. No. 17/347,302 (pp. 1-10).
Office Action (Notice of Allowance and Fees Due (PTOL-85)) dated Jun. 12, 2024 for U.S. Appl. No. 17/347,302 (pp. 1-7).

* cited by examiner (PRIOR ART)

(PRIOR ART)

GAMING MACHINE WITH A CURVED DISPLAY

CROSS REFERENCE TO RELATED APPLICATIONS

This application is a continuation of and claims priority to U.S. patent application Ser. No. 17/347,302, filed Jun. 14, 2021, which is a continuation of U.S. patent application Ser. No. 16/459,230, now U.S. Pat. No. 11,045,726, filed Jul. 1, 2019, which is a continuation of U.S. patent application Ser. No. 15/333,614, now U.S. Pat. No. 10,363,480, filed Oct. 25, 2016, which is a continuation-in-part of U.S. patent application Ser. No. 14/145,752, now U.S. Pat. No. 9,478, 097, filed Dec. 31, 2013, which are hereby incorporated by reference herein in their entireties.

BACKGROUND OF THE INVENTION

The embodiments described herein relate generally to gaming machines and, more particularly, to systems and methods for providing a game of chance on a curved video display.

Conventional gaming machines include one or more displays, such as a CRT, LCD, or touch screen displays. With advances in graphics processing capabilities of gaming machines, multiple video displays are becoming more common. These multiple video displays typically include a main game display, a secondary display and a player interface that enables the player to communicate with the gaming machine. The player interface is usually located on the main game display or coupled to the front of a cabinet of the gaming machine. Through the use of the player interface, the player can make wagers, enable pay lines, cash-out accumulated credits, prompt a play of the game or make intergame selections. Gaming machines also include bill/card/voucher acceptors for accepting and/or validating cash bills, coupons, and ticket vouchers. These bill/card/voucher acceptors may also be enabled to accept player identification cards used in rewards/loyalty programs through which players are enrolled to obtain promotions. These promotions may be things such as gifts, meals or cash back to the player based upon the players wagering activities tracked via presentment of the player identification card.

With multiple displays on a gaming machine, each display is separately configured, wired, and controlled. Thus, it is difficult to render a unified image across two or more displays which are separated or divided by a physical barrier between them. However, using a single, large LCD display presents issues regarding placement and tilting of the display, for example, while accommodating a touch screen or gesture based player interface and at the same time providing a unified view. The large display is flat and must be arranged to present touch screen buttons for use by the player at the lower extremity while at the same time positioning the top of the display at a location that is easily viewed by the player. For example, the content for a large video display may require a player to constantly re-focus between the content at the top of the display which is further away versus the content which is nearer at the middle and bottom of the display, which may lead to additional fatigue of the player. Thus, to avoid player fatigue, this arrangement results in a compromise, separate displays, and/or a horizontally arranged player interface/button deck.

BRIEF DESCRIPTION OF THE INVENTION

In one aspect, a system is provided. The system includes a display device including a display surface configured to display a graphic and including an opening. The system also includes a peripheral device including a camera and mounted within the opening of the display surface, and a processor configured to execute instructions stored in a memory device, which when executed, cause the processor to at least: display the graphic on the display surface of the display device adjacent to the peripheral device, whereby the graphic is displayed at least partially in association with the peripheral device.

In another aspect, a method is provided. The method includes receiving, by a processor of a display device, a user input to operate a peripheral device mounted at least partially within a display surface of the display device. The method also includes controlling, by the processor, the display device to display a graphic adjacent to and in association with the peripheral device, the graphic related to operating the peripheral device.

In yet another aspect, a system is provided. The system includes a display device including a display surface that includes a cutout. The system also includes a peripheral device mounted at least partially within the cutout of the display surface, whereby the peripheral device is visible to and accessible by a user of the system. In addition, the system includes a processor configured to execute instructions stored in a memory device, which when executed, cause the processor to at least: display a flowing graphic on the display surface of the display device adjacent to and at least partially around the peripheral device.

DETAILED DESCRIPTION OF THE INVENTION

Exemplary embodiments of systems and methods for use in enabling a game of chance to be displayed on a curved video display are described herein. Such embodiments provide a monolithic, integrated display panel that enables dynamic edge-to-edge graphics that flow around peripheral device to be achieved.

Exemplary technical effects of systems and methods described herein include at least one of: (a) displaying, on a portion of a curved video display adjacent to a cutout surrounding a peripheral device coupled to a cabinet of a gaming machine, a first graphic prior to an activation of the peripheral device; (b) identifying a triggering event that activates the peripheral device; and (c) displaying, on the portion of the curved video display adjacent to the cutout, a second graphic after the peripheral device is activated.

Figure 1:
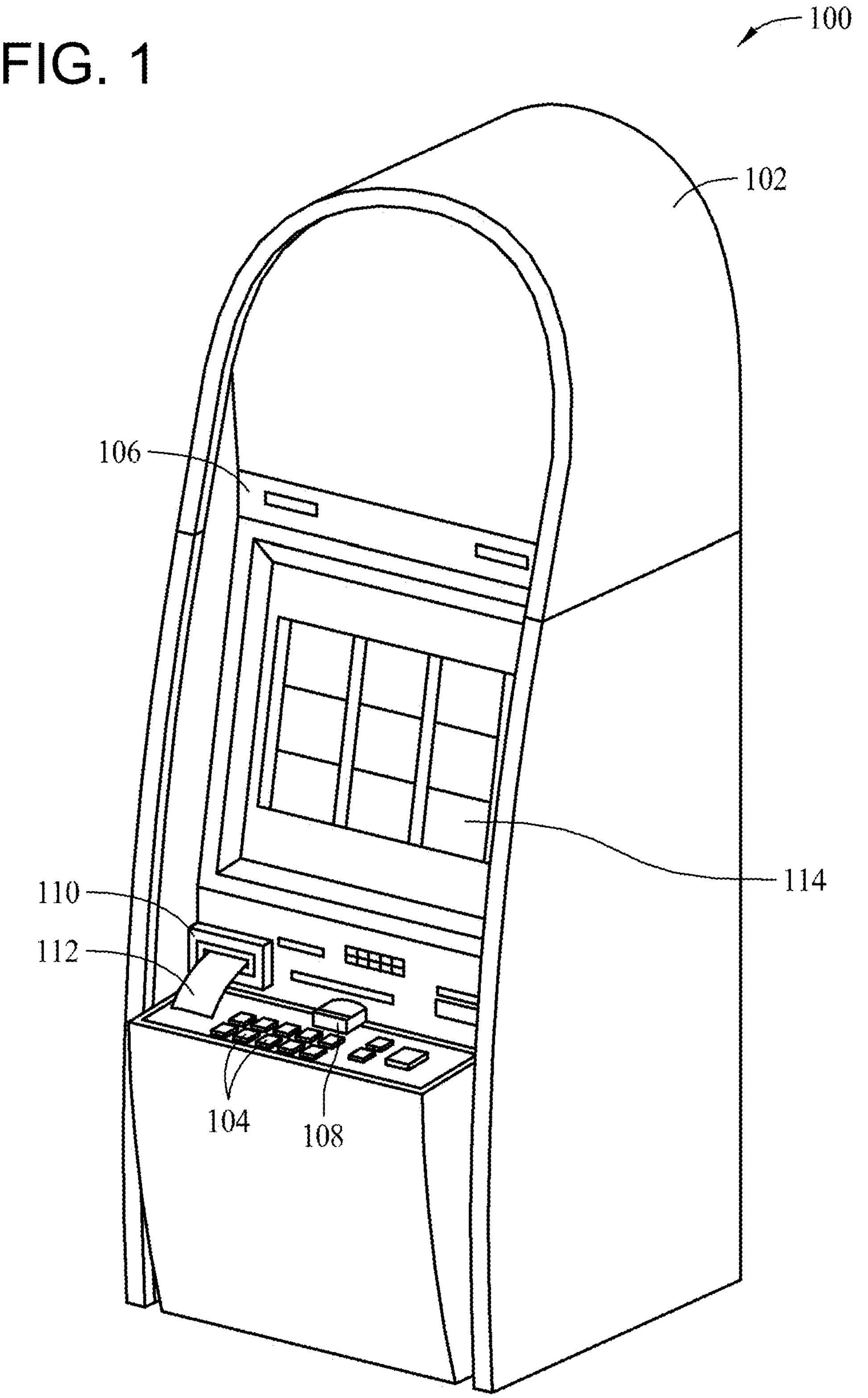
FIG. 1 is a schematic diagram of an exemplary gaming machine according to the prior art.

With reference to FIG. 1, a prior art gaming machine 100 is shown. Gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

As shown in FIG. 1, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing and accepting tickets 112 (e.g., ticket vouchers). Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used.

Gaming machine 100 further includes a video display 114 mounted to be substantially vertical within cabinet 102. Video display 114 may include a plasma display, a liquid crystal display (LCD), a display based on light emitting diodes (LEDs), organic light emitting diodes (OLEDs), polymer light emitting diodes (PLEDs), and/or surface-conduction electron emitters (SEDs). Contained within cabinet 102 is a game controller (not shown) that controls video display 114 to display game content.

Figure 2:
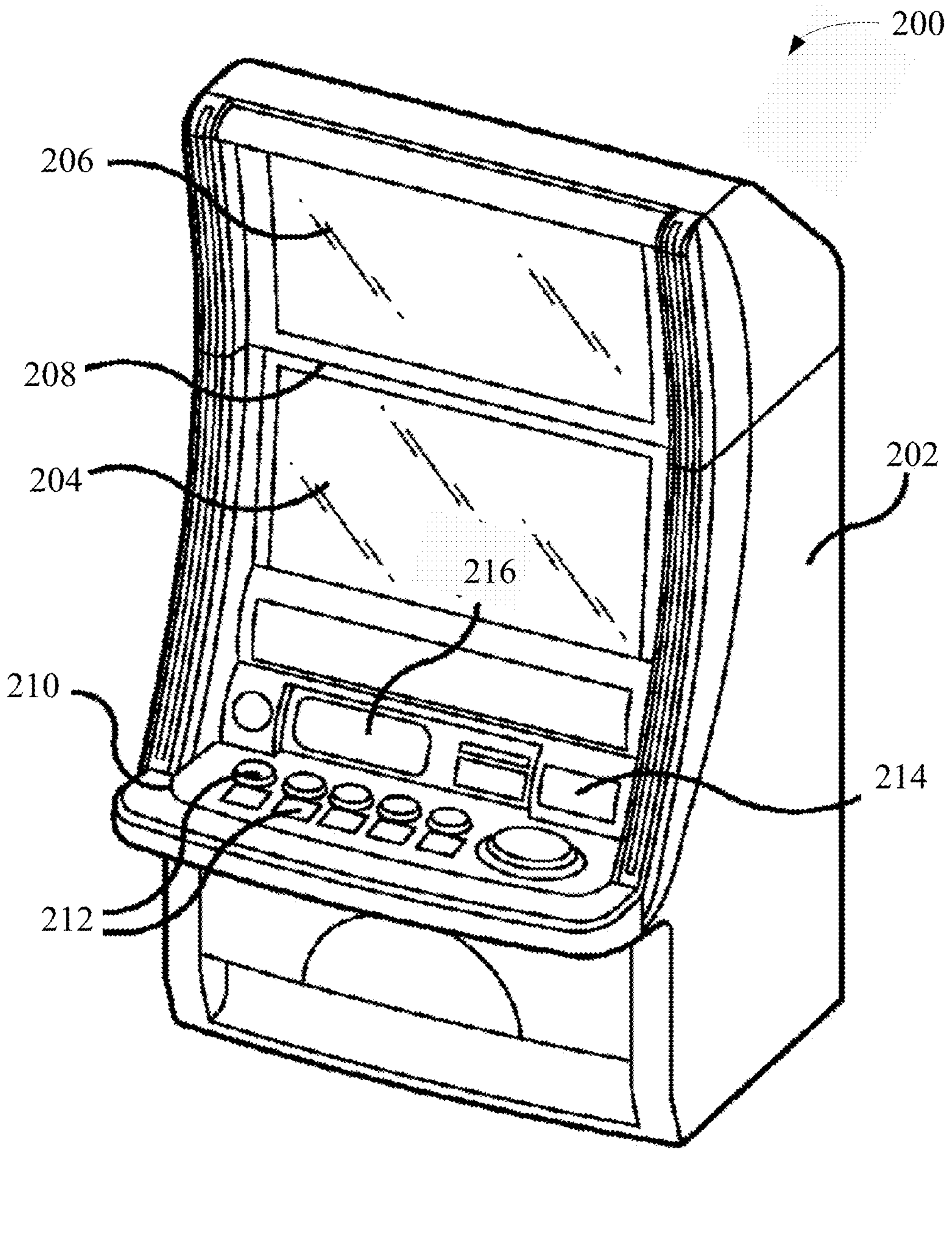
FIG. 2 is schematic diagram of another exemplary gaming machine according to the prior art.

With reference now to FIG. 2, another prior art gaming machine 200 is shown. Gaming machine 200 includes a cabinet 202 mounting a main video display 204 shown as a flat screen LCD, plasma, or touch screen display. Above main video display 204 is a secondary video display 206, which likewise is a flat screen LCD or plasma display. A mounting bezel 208 divides main display 204 from secondary display 206. A player interface, shown as a button panel 210, mounts a plurality of input buttons 212 through which a player controls an operation of a game. Below main video display 204 is an interface module 214 for interfacing with gaming machine 200, and a system interface display 216 for displaying system provided information (e.g., casino wide information and player points/comp data) to a player.

However, the arrangements of the video displays shown in FIGS. 1 and 2 result in certain drawbacks such as expense of providing multiple displays, separate wiring and harnessing, as well as the problem of providing the display of content to the player with large LCD/plasma displays without causing player fatigue or compromising the playing experience.

Figure 3:
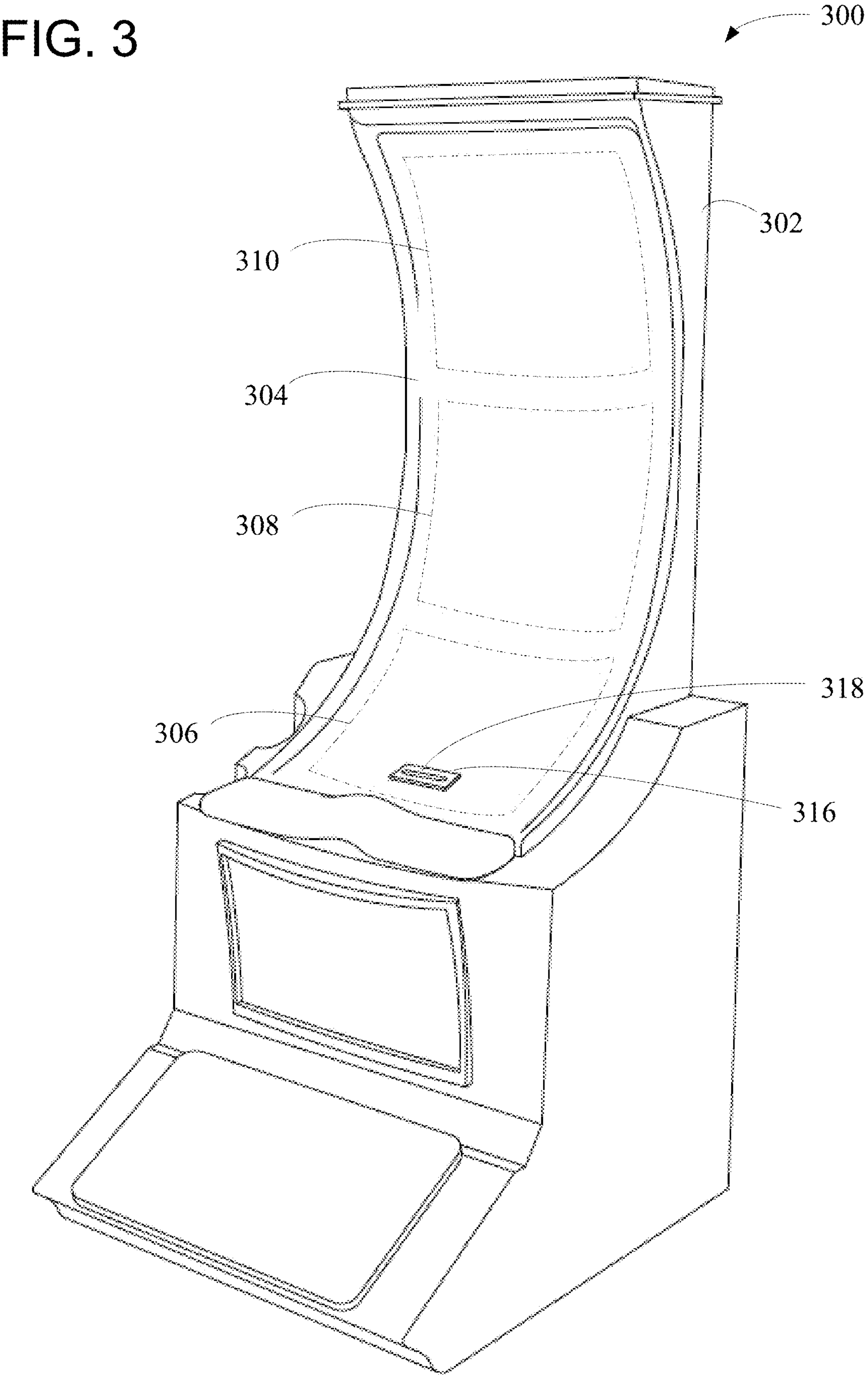
FIG. 3 is schematic diagram of an exemplary gaming machine with a curved display.

Turning now to FIG. 3, a gaming machine 300 is shown. Gaming machine 300 includes a cabinet 302 having mounted thereon a curved video display 304. Disposed within cabinet 302 are the electronics necessary to operate display 304, any user interfaces, as well as computer processors required to operate gaming machine 300. Curved video display 304 is convexly curved, and at its lower portion, presents a player interface 306 proximate a middle portion (e.g., a main display 308) and at an upper portion (e.g., a secondary display 310). Curved video display 304 may be a flexible film display, such as a color OLED display. Curved video display 304 may be a single flexible OLED display or a plurality of flexible displays configured to present a continuous curvature from player interface 306 to secondary display 310. In one embodiment, curved video display 304 may be a single display that includes separate contiguous elements. In another embodiment, one or more rear projectors project images directly on curved video display 304.

As shown in FIG. 3, curved video display 304 is curved convexly to define a continuous arc about, for example, a focus point (not shown). The focus point may be proximate a position of the eyes of an average sized user/player or above and behind the player such that player interface 306 and main display 308 are positioned as desired. Curved video display 304 could likewise be curved but defined by a plurality of foci inasmuch as curved video display 304 is flexible. For example, curved video display 304 may be curved as needed to best integrate the functions of player interface 306, main display 308, and secondary display 310. In one embodiment, curved video display 304 may be actively controlled to adjust its shape in real time based on a triggering event, such as, player input, a particular game being displayed, player characteristics (e.g., a height of a player), gaming events, and the like.

In one embodiment, player interface 306 enables a player to interact with a game presented on main display 308 and/or secondary display 310 by enabling player to place a wager, select pay lines, pick a bonus option, initiate a bonus, and the like, main display 308 displays a primary game, and secondary display 310 displays a secondary game (e.g., a bonus game). While player interface 306, main display 308, and secondary display 310 are shown in FIG. 3 with a separation there between, in one embodiment, player interface 306 may extend to main display 308, and main display 308 may extend to secondary display 310. In one embodiment, player interface 306 may be positioned above or to a side of main display 308. In another embodiment, curved video display 304 may be configured by a player (either manually, or automatically based upon some stored preferences) to adjust a size and location of player interface 306, main display 308, secondary display 310, as well as other display elements, such as credits, player inputs, rules of a game, an amount wagered, and the like.

In one embodiment, player interface 306 is positioned before the player in a 'portrait mode'. As used herein, portrait mode refers to a structural configuration of gaming machine 300 where player interface 306 is positioned such that a longer axis of player interface 306 is substantially vertical whereas a shorter axis of player interface 306 is substantially horizontal. In another embodiment, player interface 306 is positioned before the player in a 'landscape mode'. As used herein, landscape mode refers to a structural configuration of gaming machine 300 where player interface 306 is positioned such that a longer axis of player interface 306 is substantially horizontal whereas a shorter axis of player interface 306 is substantially vertical.

Player interface 306 is configured to have a touch screen or gesture based interface. In one embodiment, main display 308 and secondary display 310 are also configured to have a touch screen or gesture based interface). The touch screen interface may be any touch sensitive input device such as resistive, surface acoustic wave, capacitive (including surface capacitance and projected capacitance), force panel technology, and/or optical imaging. Player interface 306 may include a virtual button deck (not shown) that is coordinated with the input capabilities of a touch and/or gesture driven sensing used to sense player input. By touching or making the requisite gesture at a button, the player can interface with the game operated on gaming machine 300 such as making a wager, selecting the pay lines to wager upon, selecting bonus options, cashing out or selecting a denomination for play. In a related embodiment, player interface 306 may include other input and output devices including, without limitation, a touchpad, a touchscreen, a joystick, a trackball, a microphone, speakers, a camera, one or more biometric sensors, and any multiples and/or combinations of the abovementioned devices.

Secondary display 310 may display game graphics, the pay table for the game or other information. Further, during the play of the game the, main display 308 and secondary display 310 may act as a single display for bonus features, to display advertising or other information, or to display video or graphics as desired by the operator. Inasmuch as there is no physical barrier between player interface 306, main display 308, and secondary display 310, content can extend uninterrupted between all three display areas. For example, displayed content may encompass player interface 306, main display 308, and secondary display 310 such as by showing video or graphics when gaming machine 300 is in an attract mode. For example, when gaming machine 300 is not in use, the entire display 304 may be used to display video and graphics such as advertising or video programming.

Curved video display 304 further includes one or more physical cutouts 316 that enable physical peripherals to be integrated seamlessly within curved video display 304. For example, cutout 316 enables a player to access a peripheral device 318 (e.g., a bill acceptor, a ticket voucher acceptor, a printer, a barcode scanner, a camera, and a player identification card reader) coupled to/embedded in cabinet 302. The number, positions, shapes, and sizes of cutouts 316 may vary as they may depend on specifications for a particular game, installation, or peripheral device requirements. In addition, cutout 316 also enables a display of graphics on curved video display 304 to extend up to and/or surrounding peripheral device 318. Graphics (e.g., static images, animations, messages) that "wrap around" cutout 316 can be controlled to turn on and off at appropriate times. In one embodiment, the graphics that are adjacent to cutout 316 are "peripheral-related" in that they provide a user with user-friendly graphics, time dependent graphics, and graphics that are sensitive to the context of a particular event, which may overlay the specific areas of curved video display 304 as a function of game events or of user's inputs. As such, curved video display 304 is a monolithic, integrated display panel that enables dynamic edge-to-edge graphics that flow around peripheral device 318 to be achieved.

In another embodiment, peripheral device 318 is part of a mounting bezel (similar to mounting bezel 208) that attaches directly to curved video display 304. In this embodiment, curved video display includes no cutout and rather interconnects with peripheral device 318 directly via the mounting bezel. More specifically, only one edge of curved video display is in contact with peripheral device 318 (rather than surrounding peripheral device 318 as in the embodiment described earlier using the cutout).

In a related embodiment, player interface 306 is a separate bezel (either physical or virtual) that is not part of curved video display 304 but attaches directly to an edge of curved video display 304 (e.g. directly below, above, to the left, or to the right of curved video display 304 while being communicatively coupled to curved video display 304). Some portion of player interface 306 may function as a virtual bezel that is reserved (e.g., for displaying graphics) while another portion holds peripheral device 318. In yet another embodiment, curved video display 304, when in landscape mode, acquires a curvilinear orientation around a player, with the mounting bezel and one or more peripheral devices 318 also placed in a curvilinear orientation around the player as well. Additionally, one or more peripheral devices 318 are collinear with the bottom edge of the screen.

For example, prior to a player inserting money/voucher into peripheral device 318, graphics, such as an animated arrow pointing to peripheral device 318, may be displayed adjacent to peripheral device 318, directing the player where money/voucher should be inserted. Thereafter, once the player inserts the money/voucher into peripheral device 318, a graphic surrounding a perimeter of cutout 316 may be initiated. For example, an animated avatar may appear next to peripheral device 318 that says "Hello there, welcome to casino XYZ! Don't forget to swipe your player tracking card to get the double promotion we have today!" The display of graphics adjacent to peripheral device 318 enables peripheral device 318 to "talk" to a player in any language and "light up" in any color to indicate the peripheral event (cash in, cash out, card swipe, and the like) because the bezels (virtual bezels) are now part of an interactive screen (e.g., player interface 306).

In another example, a user may have just won a bonus (e.g., a ticket to a show), and peripheral device 318 is printing out an appropriate voucher. Discrete graphics (e.g., flashing arrows) may thus be generated and overlaid around peripheral device 318 (e.g., a printer (virtual) bezel's opening). In addition, interactive graphics may be used. For example, a character may appear to jump out of his symbol in a game being played on main display 308, walk over to a "SPIN" button on player interface 306, and demand the player to push the button.

Figure 4:
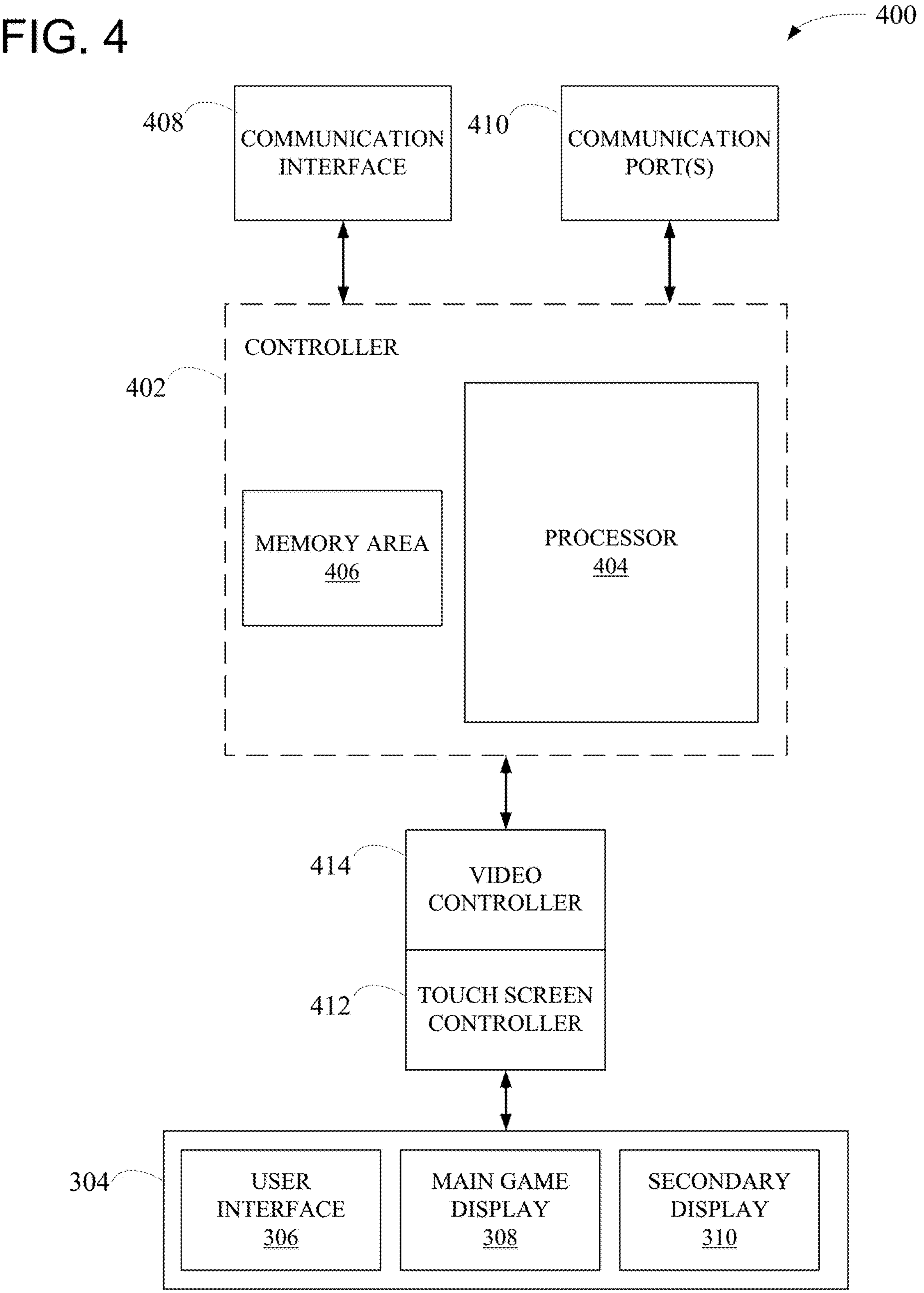
FIG. 4 is a schematic block diagram of an exemplary electrical architecture that may be used with the gaming machine shown in FIG. 3.

With reference now to FIG. 4, a schematic block diagram of an exemplary electrical architecture 400 that may be used with gaming machine 300 is shown. In the exemplary embodiment, gaming machine 300 includes a gaming machine controller 402 having a processor 404 communicatively coupled to a memory area 406. Moreover, in the exemplary embodiment, processor 404 and memory area 406 reside within cabinet 302 (shown in FIG. 3) and may be collectively referred to herein as a "computer" or "controller." Gaming machine 300 is configurable and/or programmable to perform one or more operations described herein by programming processor 404. For example, processor 404 may be programmed by encoding an operation as one or more executable instructions and providing the executable instructions in memory area 406.

Controller 402 may communicate with one or more other gaming machines or other suitable devices via a communication interface 408. Communication interface 408 may operate as an input device (e.g., by receiving data from another device) and/or as an output device (e.g., by transmitting data to another device). Processor 404 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 406 stores program code and instructions, executable by processor 404, for controlling gaming machine 300. For example, memory area 406 stores data such as image data, event data, player input data, random or pseudo-random number generation software, pay table data, trigger event conditions, game play events, game play outcomes, and/or other information or applicable game rules that relate to game play on gaming machine 300. Moreover, memory area 406 may include one or more forms of memory. For example, memory area 406 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 406 by itself or in combination. In one embodiment, the above data and program code and instructions, executable by processor 404 for enabling a player to execute a plurality of inputs using player interface 306 (shown in FIG. 3) may be stored and executed from a memory area remote from computing device gaming machine 300. For example, the data and the computer-executable instructions may be stored in a cloud service, a database, or other memory area accessible by gaming machine 300. Such embodiments reduce the computational and storage burden on gaming machine 300. As such, memory area 406 may be a local and/or a remote computer storage media including memory storage devices.

Moreover, in an exemplary embodiment, curved video display 304 (shown in FIG. 3) is controlled by controller 402. In some embodiments, one or more of player interface 306, main display 308 and secondary display 310 (shown in FIG. 3) is a touch screen associated with a touch screen controller 412. In one embodiment, the touch screen capability of player interface 306, main display 308, and secondary display 310 may be turned on and off by touch screen controller 412 based on a type of game being played, a game/information being displayed, a user preference, and other triggering events. A video controller 414 is communicatively coupled to controller 402 and touch screen controller 412 to enable a player to input game play decisions (e.g., actions) into gaming machine 300. Furthermore, gaming machine 300 includes one or more communication ports 410 that enable controller 402 to communicate with external peripheral devices (not shown) such as, but not limited to, external video sources, expansion buses, other displays, a SCSI port, or a key pad.

Figure 5:
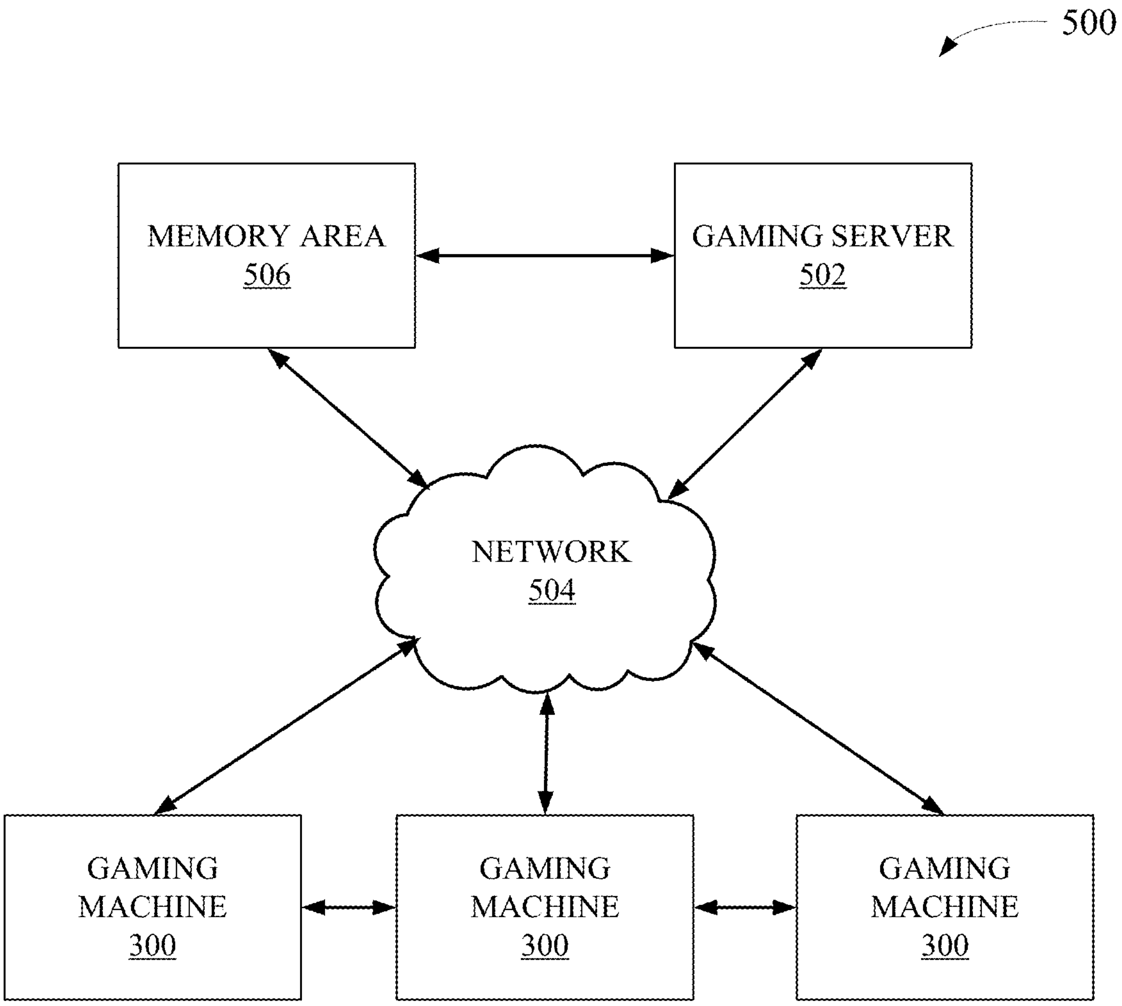
FIG. 5 is a block schematic diagram of an exemplary gaming system that includes a plurality of gaming machines shown in FIG. 3.

FIG. 5 is a block schematic diagram of an exemplary gaming system 500 that includes a plurality of gaming machines 300 (shown in FIG. 3). Each gaming machine 300 is coupled via communication interface 408 (shown in FIG. 4) to one or more servers, such as a gaming server 502, using a network 504. Gaming server 502 includes a processor (not shown) that facilitates data communication between each gaming machine 300 and other components of gaming system 500. Such data is stored in, for example, a memory area 506, such as a database, that is coupled to gaming server 502.

In one embodiment, one or more gaming machines 300 may be remote gaming machines that access a casino over network 504. In this embodiment, it will be understood that a player operating a remote gaming machine has virtual access to any casino coupled to network 504 and associated with gaming server 502. While each of gaming machines 300 may be terminal-based machines, wherein the actual games, including random number generation and/or outcome determination, are performed at gaming server each of gaming machine 300, gaming system 500 enables gaming server 502 to perform each of the these functions for gaming machines 300. In such an embodiment, gaming machines 300 display results of a game via curved video display 304 (shown in FIG. 3). Gaming server 502 may also perform a plurality of other functions including, for example, game outcome generation, executing a game play event for a player, game display functions, player tracking functions, and/or accounting functions, to name a few. However, in alternative embodiments, gaming system 500 may include a plurality of servers that separately perform these functions and/or any suitable function for use in a network-based gaming system.

In addition, gaming server 502 may also track data of players using gaming machines 300. For example, gaming server 502 can store physical characteristics of players, such as, but not limited to, a gender of a player and an age of a player. Gaming server 502 can also track and store other data related to the players using player tracking identification, such as a player card. For example, gaming server 502 can store information about a player, such as loyalty points, player address, phone number, and/or any information that may be retrieved and transmitted to gaming machines 300. In some embodiments, gaming server 502 stores and tracks information such as, but not limited to, an average amount of a wager played at gaming machines 300, any funds a player may have in an account, as well as data relating to reportable events.

Figure 6:
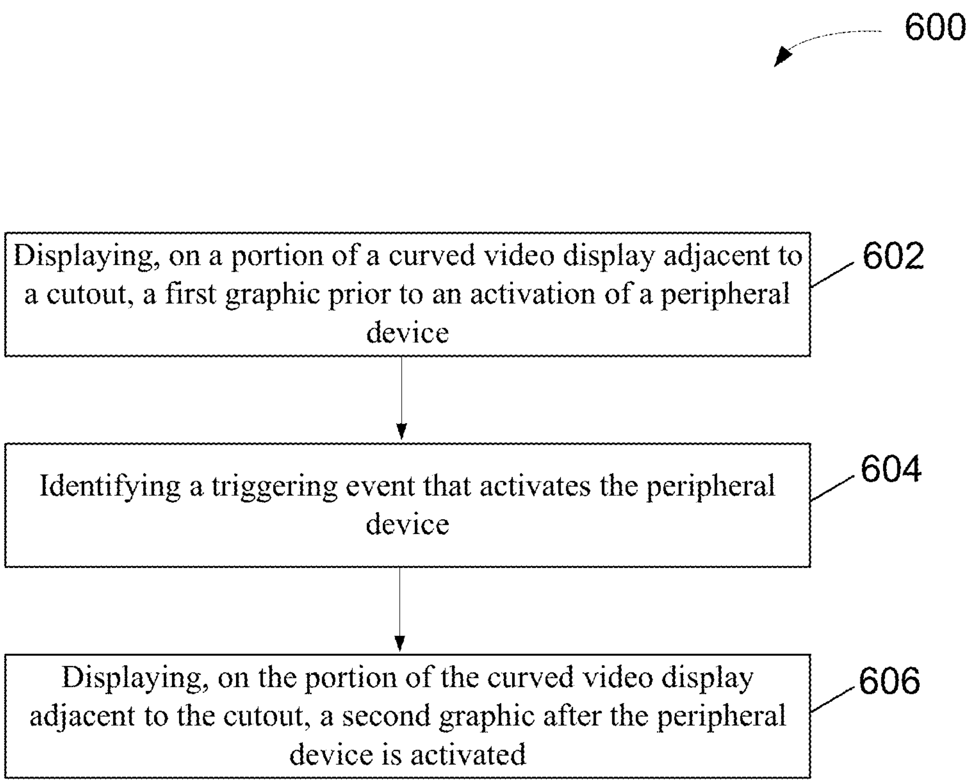
FIG. 6 is a flowchart that illustrates an exemplary method for presenting a game on a gaming machine shown in FIG. 3.

With reference now to FIG. 6, a flowchart that illustrates an exemplary method 600 for use with gaming machine 300 (shown in FIG. 3) and gaming system 500 (shown in FIG. 5) is provided. Operations in method 600 may be performed by one or more gaming machines 300, by gaming server 502, and/or by any other computing device or combination thereof. In exemplary embodiments, and referring to FIGS. 3, 4, and 5, curved video display 304 includes one or more cutouts 316 that enable physical peripherals to be integrated seamlessly within curved video display 304. For example, cutout 316 enables a player to access a peripheral device 318 (e.g., a bill acceptor, a ticket voucher acceptor, a printer, a barcode scanner, a camera, and a player identification card reader) coupled to/embedded in cabinet 302. In addition, cutout 316 also enables a display of graphics on curved video display 304 to extend up to and/or surrounding peripheral device 318. Graphics (e.g., static images, animations, messages) that "wrap around" cutout 316 can be controlled to turn on and off at appropriate times. In one embodiment, the graphics that are adjacent to cutout 316 are "peripheral-related" in that they provide a user with user-friendly graphics, time dependent graphics, and graphics that are sensitive to the context of a particular event, which may overlay the specific areas of curved video display 304 as a function of game events or of user's inputs. As such, curved video display 304 is a monolithic, integrated display panel that enables dynamic edge-to-edge graphics that flow around peripheral device 318 to be achieved.

With reference back to FIG. 6, at 602, prior to an activation of peripheral device 318, a first graphic is displayed on a portion of curved video display 304 adjacent to cutout 316. In one embodiment, the first graphic is a graphic instructing the player to insert one or more of the following into peripheral device 318: a bill, a voucher, and a player identification card. For example, prior to a player inserting money/voucher into peripheral device 318, a graphic, such as an animated arrow pointing to peripheral device 318, may be displayed adjacent to peripheral device 318, directing the player where money/voucher should be inserted.

At 604, a triggering event that activates peripheral device 318 is identified. In one embodiment, a triggering event may be an insertion of a bill, a voucher, or a player identification card into peripheral device 318. In another embodiment, a triggering event may be a lapse of a predefined period of time, a player sitting down at gaming machine 300, or a player touching curved video display 304. After peripheral device 318 is activated, at 606, a second graphic is displayed on a portion of curved video display 304 that is adjacent to cutout 316. Thus, once the player inserts money/voucher into peripheral device 318, a graphic surrounding a perimeter of cutout 316 may be initiated. For example, an animated avatar may appear next to peripheral device 318 that says "Hello there, welcome to casino XYZ! Don't forget to swipe your player tracking card to get the double promotion we have today!" The display of graphics adjacent to peripheral device 318 enables peripheral device 318 to "talk" to a player in any language and "light up" in any color to indicate the peripheral event (cash in, cash out, card swipe, and the like) because the bezels (virtual bezels) are now part of an interactive screen (e.g., player interface 306).

In another example, the triggering event that activates peripheral device 318 may be a game event, such as a user winning a bonus (e.g., a ticket to a show), and peripheral device 318 is printing out an appropriate voucher. Discrete graphics (e.g., flashing arrows) may thus be generated and overlaid around peripheral device 318 (e.g., a printer (virtual) bezel's opening). In addition, interactive graphics may be used. For example, a character may appear to jump out of his symbol in a game being played on main display 308, walk over to a "SPIN" button on player interface 306, and demand the player to push a button.

The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic gaming device comprising:

a display device including a display surface that includes an opening;

a peripheral device mounted within the opening, wherein the peripheral device comprises at least one of a bill acceptor, a ticket voucher acceptor, a printer, a barcode scanner, a camera, or a player identification card reader; and at least one processor configured to execute instructions stored in at least one memory device, wherein the instructions, when executed by the at least one processor, cause the at least one processor to:

cause display of a first graphic at a first location on the electronic gaming device, wherein the first location is adjacent to the peripheral device, and wherein the first graphic provides instructions for interacting with the peripheral device;

determine that a trigger event has occurred, wherein the trigger event is an interaction with the peripheral device; and based upon the trigger event occurring, cause display of a second graphic at a second location on the electronic gaming device, wherein the second graphic provides instructions for a subsequent interaction with the electronic gaming device.

2. The electronic gaming device of claim 1, wherein the interaction with the peripheral device is a player interaction with the peripheral device.

3. The electronic gaming device of claim 2, wherein the player interaction is at least one of inserting an object into the peripheral device, removing an object from the peripheral device, or touching the peripheral device.

4. The electronic gaming device of claim 1, wherein the second location is adjacent to a button and the instructions for the subsequent interaction are instructions for pushing the button.

5. The electronic gaming device of claim 1, wherein the second location is adjacent to a card reader and the instructions for the subsequent interaction are instructions for interacting with the card reader.

6. The electronic gaming device of claim 1, wherein the instructions for interacting with the peripheral device include instructions for inserting at least one of a bill, a voucher, or a player identification card into the peripheral device.

7. At least one non-transitory computer-readable storage medium with instructions stored thereon that, in response to execution by at least one processor, cause the at least one processor to:

cause display of a first graphic at a first location on an electronic gaming device, wherein the electronic gaming device includes a display device including a display surface that includes an opening and a peripheral device mounted within the opening, wherein the peripheral device comprises at least one of a bill acceptor, a ticket voucher acceptor, a printer, a barcode scanner, a camera, or a player identification card reader, wherein the first location is adjacent to the peripheral device, and wherein the first graphic provides instructions for interacting with the peripheral device;

determine that a trigger event has occurred, wherein the trigger event is an interaction with the peripheral device; and based upon the trigger event occurring, cause display of a second graphic at a second location on the electronic gaming device, wherein the second graphic provides instructions for a subsequent interaction with the electronic gaming device.

8. The at least one non-transitory computer-readable storage medium of claim 7, wherein the interaction with the peripheral device is a player interaction with the peripheral device.

9. The at least one non-transitory computer-readable storage medium of claim 8, wherein the player interaction is at least one of inserting an object into the peripheral device, removing an object from the peripheral device, or touching the peripheral device.

10. The at least one non-transitory computer-readable storage medium of claim 7, wherein the second location is adjacent to a button and the instructions for the subsequent interaction are instructions for pushing the button.

11. The at least one non-transitory computer-readable storage medium of claim 7, wherein the second location is adjacent to a card reader and the instructions for the subsequent interaction are instructions for interacting with the card reader.

12. The at least one non-transitory computer-readable storage medium of claim 7, wherein the instructions for interacting with the peripheral device include instructions for inserting at least one of a bill, a voucher, or a player identification card into the peripheral device.

13. A method of electronic gaming implemented by at least one processor in communication with at least one memory, the method comprising:

causing display of a first graphic at a first location on an electronic gaming device, wherein the electronic gaming device includes a display device including a display surface that includes an opening and a peripheral device mounted within the opening, wherein the peripheral device comprises at least one of a bill acceptor, a ticket voucher acceptor, a printer, a barcode scanner, a camera, or a player identification card reader, wherein the first location is adjacent to the peripheral device, and wherein the first graphic provides instructions for interacting with the peripheral device;

determining that a trigger event has occurred, wherein the trigger event is an interaction with the peripheral device; and based upon the trigger event occurring, causing display of a second graphic at a second location on the electronic gaming device, wherein the second graphic provides instructions for a subsequent interaction with the electronic gaming device.

* * * * *